(12) United States Patent
Li et al.

(10) Patent No.: US 12,439,137 B2
(45) Date of Patent: Oct. 7, 2025

(54) CAMERA MODULE AND ELECTRONIC DEVICE

(71) Applicant: VIVO MOBILE COMMUNICATION CO., LTD., Dongguan (CN)

(72) Inventors: Huacong Li, Dongguan (CN); Ze Yang, Dongguan (CN); Yunfa He, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 188 days.

(21) Appl. No.: 18/212,707

(22) Filed: Jun. 21, 2023

(65) Prior Publication Data

US 2023/0336853 A1 Oct. 19, 2023

Related U.S. Application Data

(63) Continuation of application No. PCT/CN2021/138603, filed on Dec. 16, 2021.

(30) Foreign Application Priority Data

Dec. 23, 2020 (CN) .......................... 202011542403.0

(51) Int. Cl.
*H04N 23/51* (2023.01)
*G03B 17/56* (2021.01)
*H04N 23/55* (2023.01)

(52) U.S. Cl.
CPC ........... *H04N 23/51* (2023.01); *G03B 17/561* (2013.01); *H04N 23/55* (2023.01)

(58) Field of Classification Search
CPC ........ H04N 23/54; H04N 23/55; H04N 23/57; H04N 23/687; H04N 23/51; H04N 23/685;

(Continued)

(56) References Cited

U.S. PATENT DOCUMENTS 11,366,334 B2 * 6/2022 Kasahara ............... H04N 23/55
2006/0132613 A1 * 6/2006 Shin ...................... H04N 23/687
348/208.7

(Continued)

FOREIGN PATENT DOCUMENTS

CN 105158869 A 12/2015
CN 204903931 A 12/2015

(Continued)

OTHER PUBLICATIONS

Extended European Search Report issued in related European Application No. 21909243.4, mailed May 17, 2024, 8 pages.

(Continued)

*Primary Examiner* — Abdelaaziz Tissire
(74) *Attorney, Agent, or Firm* — IPX PLLC

(57) ABSTRACT

A camera module and an electronic device are provided. The camera module includes a housing including an accommodating cavity; a lens assembly movably disposed in the accommodating cavity; a circuit board connected to the lens assembly; a support plate. At least a part of the support plate is movably disposed in the accommodating cavity. The lens assembly and the circuit board are disposed on the support plate and move synchronously with the support plate. The camera module further includes a drive assembly disposed on the housing. At least a part of the drive assembly is connected to the support plate to drive the support plate to move.

18 Claims, 3 Drawing Sheets

(58) Field of Classification Search
CPC ......... H05K 1/189; H05K 2201/10121; H05K 1/0277; G02B 27/646; G02B 7/04–105; H04M 1/0264; G03B 2205/0053–0084; G03B 7/10; G03B 13/36
See application file for complete search history.

(56) References Cited

U.S. PATENT DOCUMENTS

| | | | |
|---|---|---|---|
| 2006/0269263 A1* | 11/2006 | Kim ................. | H04N 23/68 348/E5.046 |
| 2007/0025710 A1* | 2/2007 | Shin ................. | H04N 23/68 348/E5.046 |
| 2011/0285890 A1* | 11/2011 | Choi ................. | H04N 23/55 348/308 |
| 2015/0055220 A1* | 2/2015 | Lim ................. | G02B 27/646 359/557 |
| 2017/0363881 A1 | 12/2017 | Stec | |
| 2019/0141219 A1 | 5/2019 | Oh et al. | |
| 2019/0182426 A1 | 6/2019 | Higashi | |
| 2019/0369678 A1 | 12/2019 | Park et al. | |
| 2021/0215903 A1* | 7/2021 | Rho ................. | G03B 13/36 |
| 2022/0070345 A1* | 3/2022 | Wade ................. | G02B 7/025 |
| 2023/0077936 A1 | 3/2023 | Xu | |

FOREIGN PATENT DOCUMENTS

| | | |
|---|---|---|
| CN | 206133092 A | 4/2017 |
| CN | 209151244 A | 7/2019 |
| CN | 111556239 A | 8/2020 |
| CN | 112637470 A | 4/2021 |
| CN | 112637471 A | 4/2021 |
| KR | 20100093263 A | 8/2010 |
| KR | 20170021682 A | 2/2017 |
| KR | 20190138344 A | 12/2019 |

OTHER PUBLICATIONS

International Search Report issued in corresponding International Application No. PCT/CN2021/138603, mailed Mar. 16, 2022, 5 pages.
Office Action issued in related Korean Application No. 10-2023-7025006, mailed Feb. 7, 2025, 11 pages.
Examination report issued in related Indian Application No. 202317049207, mailed Jan. 17, 2025, 6 pages.

* cited by examiner

CAMERA MODULE AND ELECTRONIC DEVICE

CROSS-REFERENCE TO RELATED APPLICATIONS

This application is a continuation of International Application No. PCT/CN2021/138603, filed on Dec. 16, 2021, which claims priority to Chinese Patent Application No. 202011542403.0 filed on Dec. 23, 2020. The entire contents of each of the above-referenced applications are expressly incorporated herein by reference.

TECHNICAL FIELD

This application relates to the field of camera technologies, and in particular to a camera module and an electronic device.

BACKGROUND

Cameras are widely used in electronic devices, especially in mobile phones, making the cameras become a hot selling point of the mobile phones. Shake caused by holding with a hand or walking during shooting or video shooting makes an image blurred and imaging quality greatly reduced. In the era of the 5th Generation Mobile Communication Technology (5G), video creation and sharing will usher in a new round of explosion, and people's requirements for video shooting devices are becoming increasingly higher. This requires that the electronic devices have good anti-shake performance, to compensate for image offset caused by shake, and provide stable and clear pictures. At present, an anti-shake pan-tilt is designed to have a large volume, which requires relatively high requirements for hardware architecture design of the electronic devices.

SUMMARY

This application is intended to provide a camera module and an electronic device.

According to a first aspect, an embodiment of this application provides a camera module, including a housing, where the housing is provided with an accommodating cavity, a lens assembly, where the lens assembly is movably disposed in the accommodating cavity; a circuit board, where the circuit board is connected to the lens assembly; a support plate, where at least a part of the support plate is movably disposed in the accommodating cavity, and the lens assembly and the circuit board are disposed on the support plate and move synchronously with the support plate; and a drive assembly, where the drive assembly is disposed on the housing, and at least a part of the drive assembly is connected to the support plate to drive the support plate to move.

According to a second aspect, an embodiment of this application provides an electronic device, including the foregoing camera module.

In the embodiments of this application, the support plate is connected to the lens assembly and the circuit board separately, the support plate is driven by the drive assembly to move, and the lens assembly and the circuit board are driven, by the support plate, to move synchronously, so that not only can the lens assembly be prevented from pulling the circuit board during movement, but also space occupied by an overall structure of the camera module can be reduced, facilitating design of stacking of the whole camera module and achieving a miniaturized anti-shake pan-tilt system.

DETAILED DESCRIPTION

Figure 1:
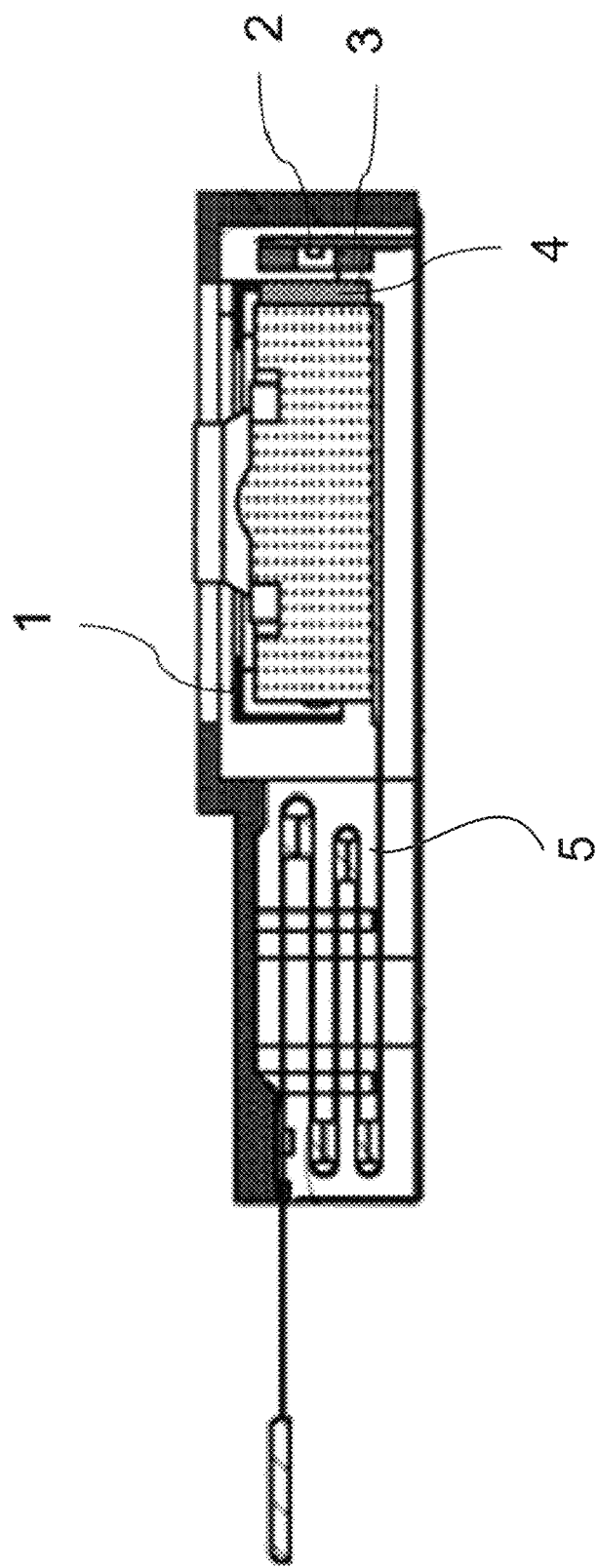
FIG. 1 is a cross-sectional view of an anti-shake pan-tilt in related technologies according to this application.
Figure 2:
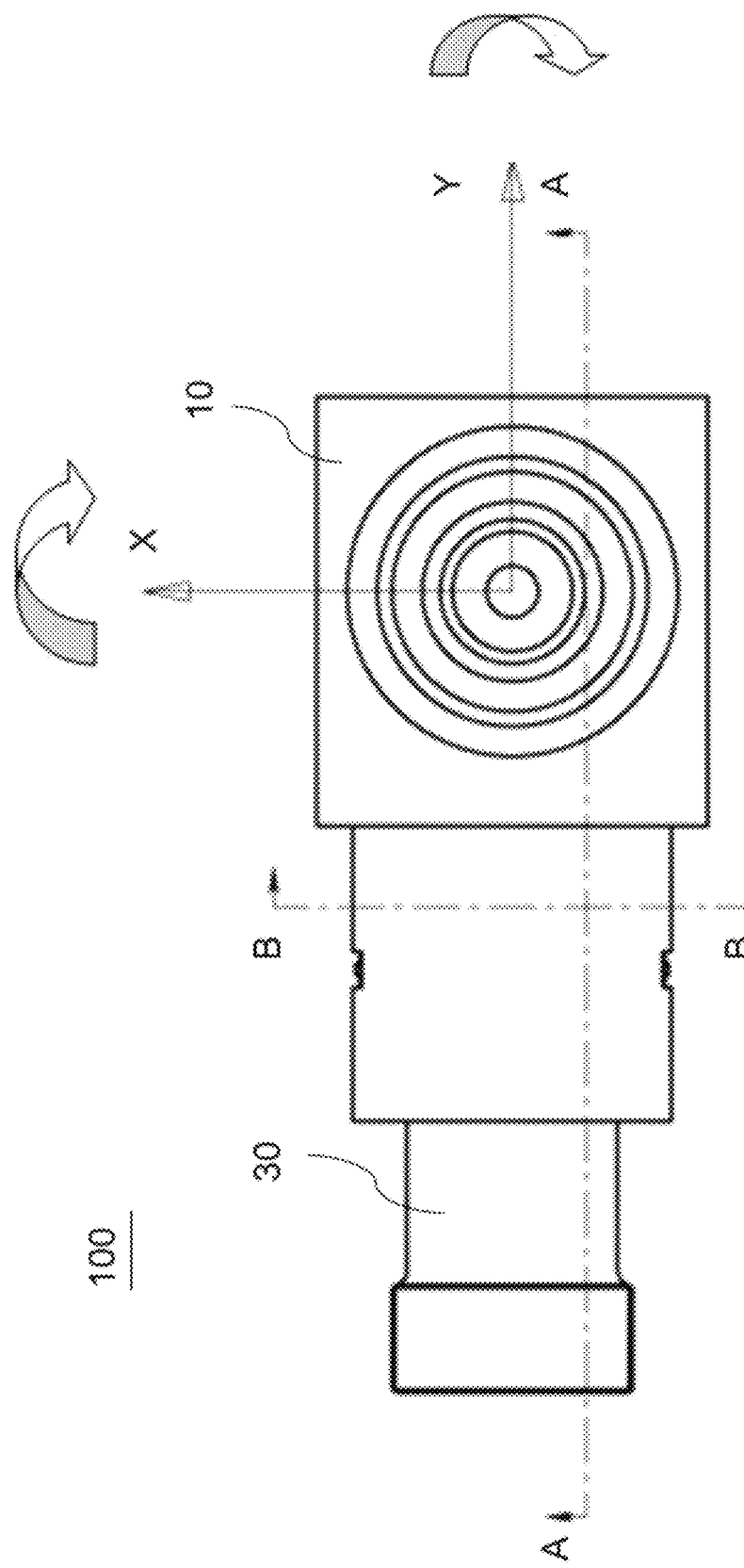
FIG. 2 is a top view of a camera module according to an embodiment of this application.

Embodiments of this application will be described in detail below. Examples of the embodiments are illustrated in the accompanying drawings, and same or similar reference numerals always indicate same or similar elements or elements having same or similar functions. The embodiments described below with reference to the accompanying drawings are examples, and are intended to only explain this application, but shall not be understood as a limitation on this application. All other embodiments further obtained by a person of ordinary skill in the art based on the embodiments of this application shall fall within the protection scope of this application.

Features of terms "first" and "second" in the specification and claims of this application may explicitly or implicitly include one or more of the features. In the descriptions of this application, unless otherwise stated, "a plurality of" means at least two. In addition, in the specification and the claims, "and/or" represents at least one of connected objects, and a character "/" generally represents an "or" relationship between associated objects.

In the description of this application, it should be understood that an orientation or positional relationship indicated by the term "center", "longitudinal", "transverse", "length", "width", "thickness", "upper", "lower", "front", "back", "left", "right", "vertical", "horizontal", "top", "bottom", "internal", "external", "clockwise", "counterclockwise", "axial direction", "radial direction", "circumferential direction", or the like is based on an orientation or positional relationship shown in the accompanying drawings, and is merely for ease of describing this application and simplifying the description, but does not indicate or imply that an apparatus or an element referred to must have a specific orientation or be constructed and operated in a specific orientation, and therefore cannot be understood as a limitation on this application.

In the description of this application, it should be noted that, unless otherwise expressly stipulated and defined, terms "install", "join", "connect", should be understood in a broad sense. For example, "connection" may be a firm connection, a detachable connection, or an integral connection; may be a mechanical connection, or an electrical connection; or may be a direct connection, an indirect connection through an intermediate medium, or a connection between two elements. A person of ordinary skill in the art can understand specific meanings of the terms in this application based on specific situations.

FIG. 1 shows an anti-shake pan-tilt in related technologies.

As shown in FIG. 1, a camera module in a related anti-shake pan-tilt has a suspended structure, and, through matching of a cross support shaft 1, an electromagnetic drive system, and a Hall sensing element 2 that are connected through a diagonal line, the camera module is driven to move, and a position of the camera module is fed back, achieving anti-shake of the module. The electromagnetic drive system includes a coil 3 and a magnet 4 which are matched with each other.

It can be seen from FIG. 1 that a camera body is embedded in the pan-tilt, and the electromagnetic drive system is disposed outside the camera body. That is, because of a unique suspension system and drive system of the pan-tilt, an overall size of the pan-tilt is extremely large, which causes a great trouble to structural stacking and design of the camera module.

Based on this, the applicant of this application creatively draws the following disclosures through long-term research and experiments.

A camera module 100 according to an embodiment of this application includes a housing 10, a lens assembly 20, a circuit board 30, a support plate 40, and a drive assembly 50.

For example, the housing 10 is provided with an accommodating cavity 11, the lens assembly 20 is movably disposed in the accommodating cavity 11, and the circuit board 30 is connected to the lens assembly 20. At least a part of the support plate 40 is movably disposed in the accommodating cavity 11, and the lens assembly 20 and the circuit board 30 are disposed on the support plate 40 and move synchronously with the support plate 40. The drive assembly 50 is disposed on the housing 10, and at least a part of the drive assembly 50 is connected to the support plate 40 to drive the support plate 40 to move.

In other words, the camera module 100 according to this embodiment of this application mainly includes the housing 10, the lens assembly 20 installed in the housing 10, the circuit board electrically connected to the lens assembly 20, the support plate 40 for limiting the lens assembly 20 and the circuit board 30, and the drive assembly 50 for driving the support plate 40. In this embodiment of this application, the housing 10 is a basic member of the camera module 100, and the housing 10 can provide an installation foundation for other components of the camera module 100 and protect parts or components such as the drive assembly. In this embodiment of this application, the housing 10 has the accommodating cavity 11, and the accommodating cavity 11 can accommodate the lens assembly 20.

During an exemplary shooting, the camera module 100 may incline due to shaking, which finally affects shooting quality. In the camera module 100 disclosed in this embodiment of this application, the lens assembly 20 is movable relative to the housing 10, and the lens assembly is driven by the drive assembly 50 to move, to compensate for tilt caused by shake of the camera module 100, effectively preventing shake of the camera module 100.

In this embodiment of this application, the lens assembly 20 and the circuit board 30 can move synchronously with the support plate 40. The support plate 40 can be used as a reinforcing plate. Therefore, when the support plate 40 is driven by the drive assembly 50 to move, the lens assembly 20 and the circuit board 30 can move simultaneously. That is, by driving the circuit board 30 to move simultaneously, relative movement of the lens assembly 20 and the circuit board 30 and of pulling of the circuit board 30 can be prevented. It should be noted that types of shift of the lens assembly 20 include movement and rotation, which are not limited herein.

Compared with a solution that the electromagnetic drive system directly drives the camera module in related technologies, for the camera module 100 according to this embodiment of this application, the drive assembly 50 indirectly drives the lens assembly 20 and the circuit board 30 by the support plate 40. On the one hand, the circuit board 30 and the lens assembly 20 can move synchronously, preventing pulling of the lens assembly 20 by a flexible circuit board 5 in related technologies, and preventing the lens assembly 20 according to this embodiment of this application from moving by a longer distance or rotating at a larger angle. On the other hand, a defect that a whole structure occupies large space caused by installing the electromagnetic drive system on the camera module in related technologies is prevented.

It should be noted that when the drive assembly 50 is installed, a part of the drive assembly 50 may be installed in the accommodating cavity 11 and connected to the support plate 40, or the drive assembly 50 may be entirely installed outside the accommodating cavity 11 and connected to the support plate 40. In addition, the part of the drive assembly 50 may be connected to the support plate 40, or the drive assembly 50 may be entirely connected to the support plate 40. A specific installation manner between the drive assembly 50 and the support plate 40 is not limited herein.

In addition, the drive assembly 50 includes, but is not limited to, a motor, and may also be another drive structure that can achieve movement of the support plate 40, such as a drive motor or a transmission mechanism including the drive motor and matching the drive motor.

Therefore, for the camera module 100 according to this embodiment of this application, the support plate 40 is connected to the lens assembly 20 and the circuit board 30 separately, the support plate 40 is driven by the drive assembly 50 to move, and the lens assembly 20 and the circuit board 30 are driven, by the support plate 40, to move synchronously, so that not only can the lens assembly 20 be prevented from pulling the circuit board 30 during movement, but also space occupied by an overall structure of the camera module 100 can be reduced, facilitating design of stacking of the whole camera module and achieving a miniaturized anti-shake pan-tilt system.

According to an embodiment of this application, the housing 10 includes a support 12 and a cover plate 13. The support 12 is provided with the accommodating cavity 11 with an opening on a first side. The lens assembly 20 may be disposed in the accommodating cavity 11 and move relative to the support 12, and the circuit board 30 may be connected to the lens assembly 20 through the opening. The cover plate 13 is disposed on the first side of the support 12, and the drive assembly 50 is disposed on the cover plate 13. In an embodiment, a part of the drive assembly 50 may be disposed on the cover plate 13, and another part of the drive assembly 50 may be disposed on the support plate 40 and move relative to the cover plate 13.

Further, the lens assembly 20 and the circuit board 30 are disposed on the first side of the support plate 40, and the drive assembly 50 is located on a second side of the support plate 40. This not only prevents the drive assembly 50 from occupying space of the lens assembly 20, but also makes full use of space on the second side of the support plate 40 and improves a space utilization rate.

For ease of description, it is defined as follows that the camera module 100 is assembled from top to bottom, with a direction close to an observer as a front side and a direction away from the observer as a rear side.

Figure 3:
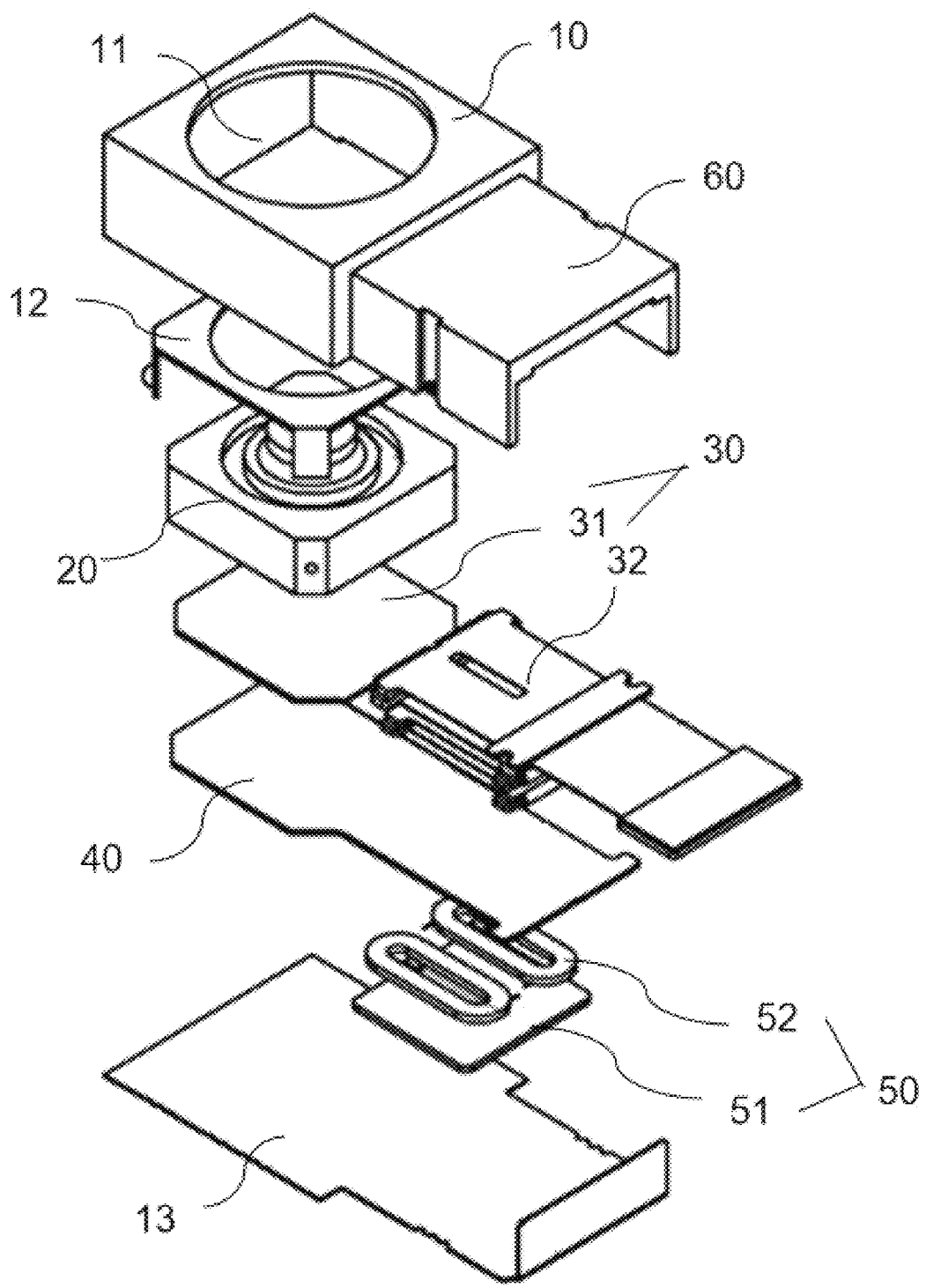
FIG. 3 is a partial exploded view of a camera module according to an embodiment of this application.

As shown in FIG. 3, an accommodating cavity 11 is defined in a support 12, and an opening is provided on a lower side of the support 12. A circuit board 30 is disposed on a front side of the support 12, and a cover plate 13 is disposed below the support 12 and the circuit board 30. During assembly, a rear end of the support plate 40 extends between the support 12 and the cover plate 13, and the rear end of the support plate 40, the circuit board 30, and the lens assembly are connected from bottom to top, and the front end of the support plate 40 is disposed between the cover plate 13 and the circuit board 30. When the lens assembly 20 and the circuit board 30 are to be moved, the drive assembly 50 is disposed on the cover plate 13, and the support plate 40 is driven by the drive assembly 50 to move, so that the circuit board 30 and the lens assembly 20 can be driven to move.

It should be noted that the foregoing definitions of up, down, front, and rear sides are only for describing positional relationships or connection relationships of components of the camera module 100 in this embodiment of this application, and do not limit this embodiment of this application.

In addition, for same parts in this embodiment of this application, only one part or component may be provided with a reference numeral in the drawing, and the reference numeral is also applicable to other same parts or components.

According to an embodiment of this application, the circuit board 30 includes a first board body 31 and a second board body 32. The first board body 31 is disposed between the lens assembly 20 and the support plate 40. The lens assembly 20 is disposed on a first side of the first board body 31. A second side of the first board body 31 is connected to the first side of the support plate 40. The second board body 32 is disposed on the first side of the support plate 40. The second board body 32 is electrically connected to the first board body 31. The second board body 32 may be a flexible circuit board, a wire, or the like. As shown in FIG. 3, the first board body 31 is located on a rear side of the second board body 32 and below the lens assembly 20. When the circuit board and the support plate 40 are assembled, a lower side of the first board body 31 and a lower side of the second board body 32 can be connected to an upper side of the support plate 40 separately. The circuit board 30 is divided into the first board body 31 and the second board body 32, which facilitates connection between the circuit board 30 and the lens assembly 20 and movement of the lens assembly 20 on the premise that the circuit board 30 and the support plate 40 move synchronously.

In this embodiment of this application, the first board body 31 is a circuit board, and the second board body 32 is a flexible circuit board. During assembly, the second board body 32 may be folded along an S-shape, and when the lens assembly 20 moves, the second board body 32 can extend and contract synchronously, expanding a movement range of the lens assembly 20. Further, the second board body 32 is disposed opposite to the drive assembly 50, so that space below the second board body 32 can be fully utilized, and an overall structural size of the camera module 100 is prevented from being increased when the drive assembly 50 is placed below the lens assembly 20. When the housing 10 further includes a wiring box 60, as shown in FIG. 3, the wiring box 60 may be located on the front side of the support 12, and the second board body 32 and the drive assembly 50 may be located in the wiring box 60 simultaneously, so that accommodating space of the flexible circuit board can be fully utilized.

In some implementations of this application, a shape of the first board body 31 corresponds to a shape of a first side surface of the lens assembly 20, and the support plate 40 corresponds to a shape of the first board body 31 and a shape of the second board body 32, increasing stability and reliability of an overall structure when the lens assembly 20 and the circuit board 30 move.

According to an embodiment of this application, the drive assembly 50 includes a magnetic member 51 and a coil 52. One of the magnetic member 51 and the coil 52 is connected to the cover plate 13, and the other of the magnetic member 51 and the coil 52 is connected to the support plate 40. The coil 52 is movable relative to the magnetic member 51 after being energized to drive the support plate 40. In other words, the magnetic member 51 may be disposed on the cover plate 13, and the coil 52 may be disposed on the support plate 40. In some alternative embodiments, the magnetic member 51 may be disposed on the support plate 40, and the coil 52 may be disposed on the cover plate 13. For example, as shown in FIG. 3, the magnetic member 51 is disposed on an upper end surface of the cover plate 13, and the coil 52 is disposed on a lower end face of the support plate 40.

It should be noted that when the drive assembly 50 includes the magnetic member 51 and the coil 52, the support plate 40 may be a non-magnetic-conductive rigid material.

When the drive assembly 50 works, the magnetic member 51 and the coil 52 match each other. According to Fleming's left-hand rule, a force perpendicular to a magnetic field direction is generated in the coil 52 that is energized, and the force can control the movement of the support plate 40 when acting on the support plate 40.

Further, the magnetic member 51 has a plate structure, that is, the magnetic member 51 may be a flat coil, which can effectively save space. The magnetic member 51 is attached to the cover plate 13, to facilitate assembly of the magnetic member 51. It should be noted that the magnetic member 51 may also be installed on the cover plate 13 in other installation manners, such as clamping and plugging.

In this embodiment of this application, a quantity of the coils 52 is one, and various types of movement of the support plate 40 can be implemented by one coil 52. For example, if the coil 52 is a linear conductor, after the linear conductor is energized, the linear conductor moves. When a current direction or magnetic field direction is changed, the linear conductor moves in an opposite direction, so that the support plate 40 can be driven to move. If the coil 52 is an annular conductor, after the annular conductor is energized, two sides of the annular conductor are subject to forces in different directions, and the annular conductor can rotate around an axis of the annular conductor, to drive the support plate 40 to rotate along a direction.

In this embodiment of this application, the coils 52 are two annular coils, and the two coils 52 are arranged on the support plate 40 at intervals. Refer to FIG. 3. For example, the coil 52 may include a first annular coil and a second annular coil, and the first annular coil and the second annular coil may share a magnet. By enabling the first annular coil and the second annular coil to work at different time periods, the support plate 40 can rotate along a direction.

In this embodiment of this application, the support plate 40 is a roughly rectangular member. A straight line parallel to a length direction of the support plate 40 is a Y axis, a straight line parallel to a width direction of the support plate 40 is an X axis, and a straight line perpendicular to a plane where the support plate 40 is located is a Z axis. Various parts or components of the camera module 100 may be assembled roughly along a Z-axis direction. The first annular coil and the second annular coil are located on the upper end surface of the support plate 40 and arranged at intervals along a length direction of the support plate 40. Both the first annular coil and the second annular coil are oval members roughly extending along a width direction of the support plate 40. When the first annular coil and the second annular coil generate same acting forces, or when the first annular coil or the second annular coil is enabled separately, the support plate 40 can rotate around the Y axis by limiting a current direction and a magnetic field direction.

In this embodiment of this application, when the support plate 40 has a symmetrical structure, a center line of a connecting line between two coils 52 can share a symmetrical center line with the support plate 40, facilitating force bearing analysis of the support plate 40.

It should be noted that a quantity of the coils 52 is not limited, and the coils 52 may also be arranged in another form, which is not limited herein.

To facilitate control of a rotation angle, the camera module 100 in this embodiment of this application further includes a position feedback element 70. Positions of the lens assembly 20 and/or the circuit board 30 can be fed back in real time through the position feedback element 70. The position feedback element 70 may be connected to the drive assembly 50. A magnitude and direction of a force applied to the support plate 40 can be controlled according to a real-time position of the lens assembly 20 or the circuit board 30, flexibly changing a direction of the lens assembly 20, thereby increasing anti-shake performance of the camera module 100. It should be noted that the position feedback element 70 may be a Hall chip or the like, which is not limited herein.

In this embodiment of this application, if the coil 52 is the annular coil, the position feedback element 70 may be installed at a hollow structure of the annular coil, helping to save space.

It should be noted that, in this embodiment of this application, technical means such as detecting a position and rotation angle by matching of the position feedback element 70 and a magnet are well-known technologies. Details are not described herein.

An embodiment of this application further provides an electronic device, including the camera module 100 in any one of the foregoing embodiments. The lens assembly 20 may be electrically connected to a motherboard of the electronic device through the circuit board 30, thereby achieving power supply to the lens assembly 20.

The electronic device according to this embodiment of this application may be an action camera, an unmanned aerial vehicle with a pan-tilt, a smart phone, a tablet computer, a wearable device, and the like, which is not limited herein.

In the description of this specification, descriptions with reference to the term such as "an embodiment", "some embodiments", "exemplary embodiment", "example", "specific example", or "some examples" mean that a feature, structure, material, or characteristic described with reference to the embodiment or example are included in at least one embodiment or example of this application. In this specification, illustrative expressions of these terms do not necessarily refer to a same embodiment or example. Moreover, the feature, structure, material, or characteristic described may be combined in any suitable manner in any one or more embodiments or examples.

Although the embodiments of this application have been shown and described, those skilled in the art can understand that a plurality of changes, modifications, substitutions, and variations can be made to these embodiments without departing from the principle and purpose of this application, and the scope of this application is defined by the claims and equivalents of the claims.

The invention claimed is:

1. A camera module, comprising:
 a housing comprising an accommodating cavity;
 a lens assembly movably disposed in the accommodating cavity;
 a circuit board connected to the lens assembly, wherein the circuit board comprises:
  a first board body disposed between the lens assembly and a support plate; and
  a second board body disposed on the support plate and electrically connected to the first board body, wherein the second board body is folded along an S-shape by default and flexible to unfold during use of the camera module;
 a pan-tilt assembly comprising the support plate, wherein at least a part of the support plate is movably disposed in the accommodating cavity, and the lens assembly and the circuit board are disposed on the support plate; and
 a drive assembly disposed in the housing, wherein at least a part of the drive assembly is connected to the support plate to drive the support plate to move.

2. The camera module according to claim 1, wherein the housing comprises:
 a support comprising the accommodating cavity with an opening on a first side; and
 a cover plate disposed on the first side of the support, wherein the drive assembly is disposed on the cover plate.

3. The camera module according to claim 2, wherein the lens assembly and the circuit board are located on a first side of the support plate, and the drive assembly is located on a second side of the support plate.

4. The camera module according to claim 2,
 wherein the lens assembly is disposed on a first side of the first board body, and a second side of the first board body is connected to a first side of the support plate; and
 the second board body is disposed on the first side of the support plate.

5. The camera module according to claim 4, wherein the second board body is a flexible circuit board.

6. The camera module according to claim 4, wherein a shape of the first board body corresponds to a shape of a first side surface of the lens assembly, and the support plate corresponds to a shape of the first board body and a shape of the second board body.

7. The camera module according to claim 2, wherein the drive assembly comprises:
 a magnetic member and a coil, wherein:
  one of the magnetic member or the coil is connected to the cover plate,
  the other of the magnetic member or the coil is connected to the support plate, and
  the coil is movable relative to the magnetic member after being electrified to drive the support plate.

8. The camera module according to claim 7, wherein the magnetic member is a plate structure, and the magnetic member is attached to the cover plate.

9. The camera module according to claim 7, wherein the coils are two annular coils, and the two coils are arranged on the support plate at intervals.

10. An electronic device, comprising a camera module, comprising:
 a housing comprising an accommodating cavity;
 a lens assembly movably disposed in the accommodating cavity, wherein the circuit board comprises:

a first board body disposed between the lens assembly and a support plate; and a second board body disposed on the support plate and electrically connected to the first board body, wherein the second board body is folded along an S-shape by default and flexible to unfold during use of the camera module:

a circuit board connected to the lens assembly;

a pan-tilt assembly comprising the support plate, wherein at least a part of the support plate is movably disposed in the accommodating cavity, and the lens assembly and the circuit board are disposed on the support plate; and a drive assembly disposed in the housing, wherein at least a part of the drive assembly is connected to the support plate to drive the support plate to move.

11. The electronic device according to claim 10, wherein the housing comprises:

a support comprising the accommodating cavity with an opening on a first side; and a cover plate disposed on the first side of the support, and the drive assembly is disposed on the cover plate.

12. The electronic device according to claim 11, wherein the lens assembly and the circuit board are located on a first side of the support plate, and the drive assembly is located on a second side of the support plate.

13. The electronic device according to claim 11, wherein the lens assembly is disposed on a first side of the first board body, and a second side of the first board body is connected to a first side of the support plate; and the second board body is disposed on the first side of the support plate.

14. The electronic device according to claim 13, wherein the second board body is a flexible circuit board.

15. The electronic device according to claim 13, wherein a shape of the first board body corresponds to a shape of a first side surface of the lens assembly, and the support plate corresponds to a shape of the first board body and a shape of the second board body.

16. The electronic device according to claim 11, wherein the drive assembly comprises: a magnetic member and a coil, wherein:

one of the magnetic member or the coil is connected to the cover plate, the other of the magnetic member or the coil is connected to the support plate, and the coil is movable relative to the magnetic member after being electrified to drive the support plate.

17. The electronic device according to claim 16, wherein the magnetic member is a plate structure, and the magnetic member is attached to the cover plate.

18. The electronic device according to claim 16, wherein the coils are two annular coils, and the two coils are arranged on the support plate at intervals.

* * * * *